United States Patent
Ito et al.

(10) Patent No.: US 10,746,014 B2
(45) Date of Patent: Aug. 18, 2020

(54) METHOD AND SYSTEM FOR MONITORING A CONDITION OF AN ELASTIC ELEMENT USED IN A DOWNHOLE TOOL

(71) Applicant: Schlumberger Technology Corporation, Sugar Land, TX (US)

(72) Inventors: Masaei Ito, Sagamihara (JP); Manuel Marya, Sugar Land, TX (US); Tsutomu Yamate, Yokohama (JP); Osamu Osawa, Tokyo (JP)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 45 days.

(21) Appl. No.: 15/892,912

(22) Filed: Feb. 9, 2018

(65) Prior Publication Data

US 2019/0249540 A1   Aug. 15, 2019

(51) Int. Cl.
| | | |
|---|---|---|
| *E21B 33/127* | (2006.01) | |
| *E21B 47/00* | (2012.01) | |
| *E21B 33/12* | (2006.01) | |
| *G01B 21/32* | (2006.01) | |
| *G01M 13/005* | (2019.01) | |
| *G01B 1/00* | (2006.01) | |
| *G01B 7/16* | (2006.01) | |

(52) U.S. Cl.
CPC .............. *E21B 47/00* (2013.01); *E21B 33/12* (2013.01); *G01B 1/00* (2013.01); *G01B 21/32* (2013.01); *G01M 13/005* (2013.01); *G01B 7/22* (2013.01)

(58) Field of Classification Search
CPC ..................................................... E21B 33/127
See application file for complete search history.

(56) References Cited

U.S. PATENT DOCUMENTS

| | | | |
|---|---|---|---|
| 4,886,117 A | | 12/1989 | Patel |
| 5,500,065 A | * | 3/1996 | Koch ................. B60C 23/0493 156/110.1 |
| 6,003,872 A | * | 12/1999 | Nord .................... F16J 15/3296 277/317 |
| 6,223,821 B1 | * | 5/2001 | Coronado ............. E21B 33/127 166/250.01 |
| 6,615,639 B1 | * | 9/2003 | Heinzen .................. F16J 15/16 116/208 |
| 6,817,228 B2 | | 11/2004 | Upton et al. |
| 7,152,375 B1 | * | 12/2006 | Mastro .................... B63B 19/26 49/507 |
| 7,316,154 B1 | * | 1/2008 | Bennett .................. F16J 15/064 277/320 |

(Continued)

*Primary Examiner* — Kenneth L Thompson
(74) *Attorney, Agent, or Firm* — Eileen Pape

(57) ABSTRACT

A method and a system for monitoring a condition of an elastic element used in a downhole tool are provided. The method comprises acquiring an output signal from a flexible-type sensor installed in the elastic element, the sensor sensing at least one of strain and stress of the elastic element, and estimating a condition of the elastic element based on the output signal from the sensor. The system comprises a flexible-type sensor installed in the elastic element, the sensor sensing at least one of strain and stress of the elastic element and a processor to acquire an output signal from the sensor and estimate a condition of the elastic element based on the output signal from the sensor.

14 Claims, 9 Drawing Sheets

(56) References Cited

U.S. PATENT DOCUMENTS

| | | | |
|---|---|---|---|
| 7,845,648 B2* | 12/2010 | Keefe | B60J 10/50 277/630 |
| 7,896,086 B2* | 3/2011 | Guerrero | E21B 33/068 166/381 |
| 7,919,554 B2 | 4/2011 | Noguchi et al. | |
| 8,264,347 B2* | 9/2012 | Castleman | F16J 15/064 340/540 |
| 8,336,181 B2 | 12/2012 | Corre et al. | |
| 8,479,832 B2 | 7/2013 | Tunc et al. | |
| 8,949,041 B2* | 2/2015 | Schenk | F16J 15/064 702/34 |
| 9,051,804 B2 | 6/2015 | Reid, Jr. et al. | |
| 9,175,776 B2 | 11/2015 | Pessin et al. | |
| 9,322,240 B2 | 4/2016 | Corre et al. | |
| 9,366,107 B2* | 6/2016 | Hallundbæk | E21B 33/1277 |
| 9,368,901 B2 | 6/2016 | Gicquel | |
| 9,466,916 B2 | 10/2016 | Li et al. | |
| 9,541,199 B2* | 1/2017 | Rust | F16J 15/064 |
| 2004/0060696 A1* | 4/2004 | Schultz | E21B 33/12 166/250.01 |
| 2004/0083719 A1 | 5/2004 | Xu et al. | |
| 2004/0173363 A1* | 9/2004 | Navarro-Sorroche | E21B 47/06 166/387 |
| 2007/0241510 A1* | 10/2007 | DiLeo | B01D 35/14 277/321 |
| 2011/0156357 A1 | 6/2011 | Noguchi et al. | |
| 2013/0285830 A1* | 10/2013 | Hallundbaek | G01V 11/002 340/854.9 |
| 2015/0268106 A1 | 9/2015 | Otaka et al. | |
| 2018/0051531 A1* | 2/2018 | Akbari | E21B 33/1208 |

\* cited by examiner

METHOD AND SYSTEM FOR MONITORING A CONDITION OF AN ELASTIC ELEMENT USED IN A DOWNHOLE TOOL

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art. The following descriptions and examples are not admitted to be prior art by virtue of their inclusion in this section.

The present disclosure relates generally to methods and systems for monitoring a condition of an elastic element used in a downhole tool such as a wireline logging tool, a LWD (logging-while-drilling) or MWD (measurements while drilling) tool.

In a downhole of the oilfield or gasfield, various types of elastic elements have been developed to used to provide adequate sealing in such environments. For example, a seal in a field joint or bulkhead and an inflatable packer for MDT (Modular Formation Dynamics Tester) used in a downhole tool such as a wireline logging tool, a LWD or MWD tool, as described in the documents of U.S. Pat. Nos. 6,817,228, 9,051,804, 9,368,901, 9,466,916, U.S. Pat Application Publication No. 2004/0083719, U.S. Pat. Nos. 4,886,117, 8,336,181, 8,479,832, 9,175,776 and 9,322,240, the contents of which are incorporated herein in their entirety by reference thereto.

There is a need, however, for monitoring a condition of the elastic element such as a seal and inflatable packer used in the downhole tool to prevent a failure of the elastic element.

SUMMARY OF THE DISCLOSURE

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect of the present disclosure, a method for monitoring a condition of an elastic element used in a downhole tool comprises acquiring an output signal from a flexible-type sensor installed in the elastic element, and estimating a condition of the elastic element based on the output signal from the sensor. The sensor senses at least one of strain and stress of the elastic element.

In the method of the disclosure, the elastic element may be a seal in a field joint or bulkhead used in the downhole tool and the method may further comprise estimating a condition of a primary seal of dual seals based on the output signal from the sensor, and foretelling a working time of a secondary seal of the dual seals after the primary seal fails, based on the estimated condition of the primary seal. In the method of the disclosure, the elastic element may be an inflatable packer for an MDT (Modular Formation Dynamics Tester) used in a downhole tool and the method may further comprise measuring an elongation of the packer based on the output signal, and optimizing an applied internal pressure on the packer based on the measured elongation.

In another aspect of the present disclosure, a system for monitoring a condition of an elastic element used in a downhole tool comprises a flexible-type sensor installed in the elastic element, and a processor to acquire an output signal from the sensor and estimate a condition of the elastic element based on the output signal from the sensor. The sensor senses at least one of strain and stress of the elastic element.

In the system of the disclosure, the elastic element may be a seal in a field joint or bulkhead used in the downhole tool, and the processor may be used to estimate a condition of a primary seal of dual seals based on the output signal from the sensor and foretell a working time of a secondary seal of the dual seals after the primary seal fails, based on the estimated condition of the primary seal. In the system of the disclosure, the elastic element may be an inflatable packer for an MDT (Modular Formation Dynamics Tester) used in a downhole tool, and the processor may be used to measure an elongation of the packer based on the output signal and optimize an applied internal pressure on the packer based on the measured elongation.

In the methods and systems of the disclosure, the sensor may be a flexible polymer-type sensor. The flexible polymer-type sensor may be a fluoropolymers-type sensor. The downhole tool may be a wireline logging tool, a LWD (logging-while-drilling) or MWD (measurements while drilling) tool.

Advantages and novel features of the disclosures will be set forth in the description which follows or may be learned by those skilled in the art through reading the materials herein.

BRIEF DESCRIPTION OF THE DRAWINGS

Embodiments of a downhole apparatus and components thereof according to the disclosures herein are described with reference to the following figures. The same numbers are used throughout the figures to reference like features and components.

DETAILED DESCRIPTION

Illustrative embodiments and aspects of the present disclosure are described below. In the interest of clarity, not all features of an actual implementation are described in the specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such development effort might be complex and time-consuming, but would nevertheless be a routine undertaking for those of ordinary skill in the art having benefit of the disclosure herein.

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present disclosure. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

As used throughout the specification and claims, the term "downhole" refers to a subterranean environment, particularly in a wellbore. "Downhole tool" is used broadly to mean any tool used in a subterranean environment including, but not limited to, a logging tool, an imaging tool, an acoustic tool, a permanent monitoring tool, and a combination tool.

The signal processing systems herein may be incorporated in tool systems such as wireline logging tools, measurement-while-drilling and logging-while-drilling tools, permanent monitoring systems, sondes, among others. For purposes of this disclosure, when any one of the terms wireline, cable line, slickline or coiled tubing or conveyance is used it is understood that any of the referenced deployment means, or any other suitable equivalent means, may be used with the present disclosure without departing from the spirit and scope of the present disclosure.

Moreover, inventive aspects lie in less than all features of a single disclosed embodiment. Thus, the claims following the Detailed Description are hereby expressly incorporated into this Detailed Description, with each claim standing on its own as a separate embodiment.

Various embodiments incorporating the methods and techniques of this disclosure follow an integrated approach using conventional sonic, ultrasonic and borehole seismic to enable various kinds of measurements such as an evaluation of cement in a wellbore.

Figure 1A:
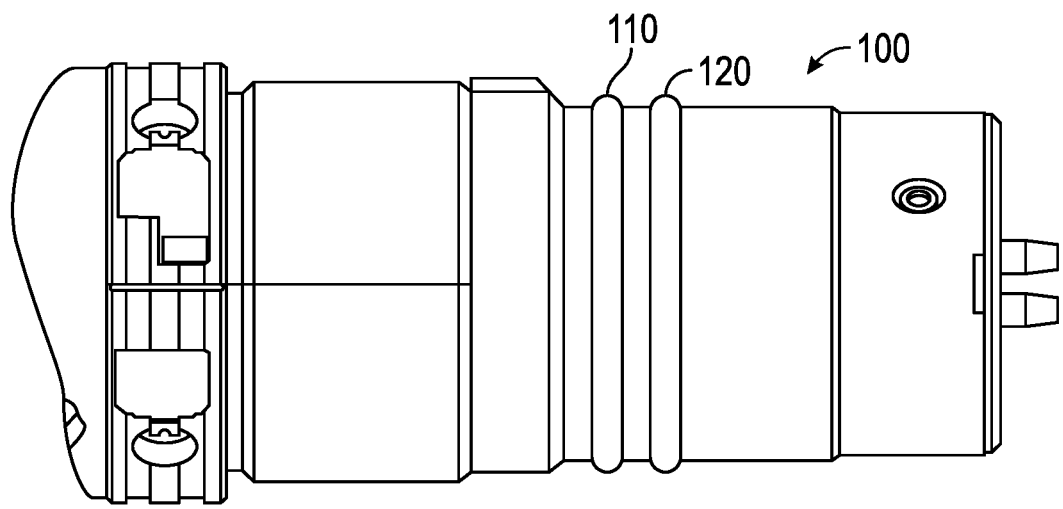
FIGS. 1A and 1B are, respectively, a side view and a local sectional view of one example of a field joint according to embodiments of the disclosure.
Figure 1B:
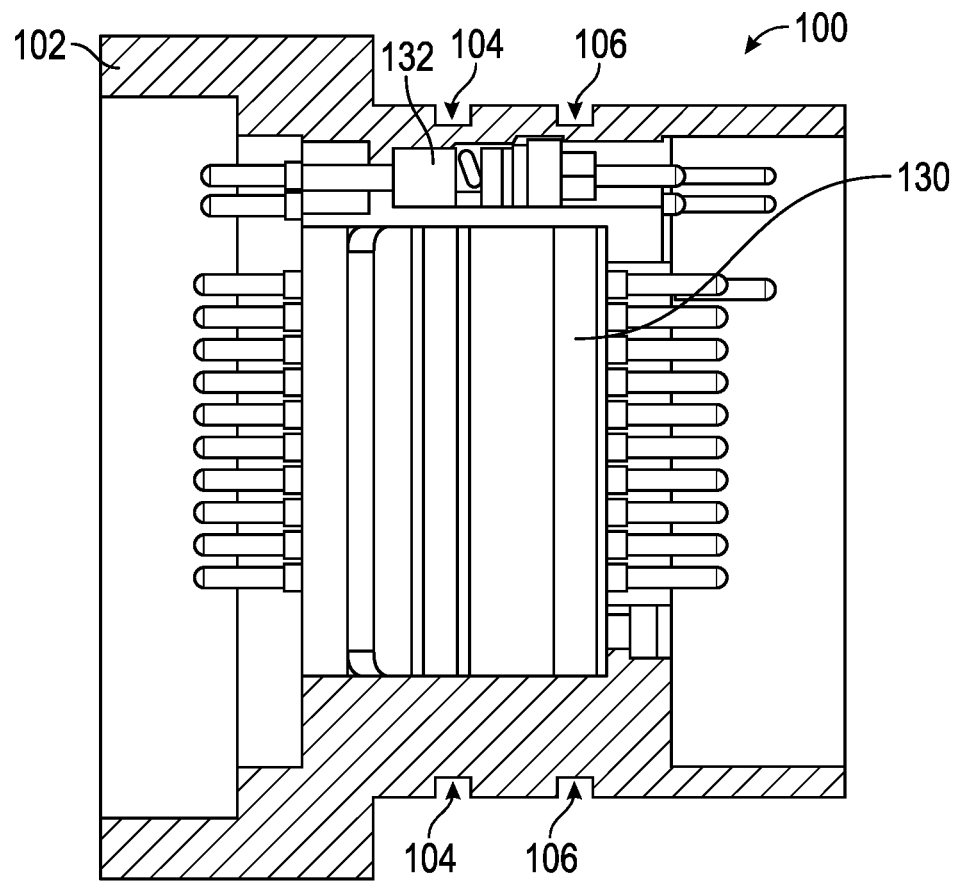

Turning to the figures, FIGS. 1A and 1B are, respectively, a side view and a local sectional view of one example of a field joint 100 according to embodiments of the disclosure. The field joint 100 is used for connecting a plurality of downhole tool modules of a downhole tool such as a wireline logging tool, a LWD or MWD tool. The field joint 100 includes a housing 102 and an electrical connector assembly having a connector block 130 and electrical feedthroughs 132 disposed in the housing 102. Each of the modules includes a housing and an electrical line. Connecting pins located on one side of the connector assembly is coupled to electrical lines of a first module and connecting pins on another side of the connector assembly is coupled to electrical lines of a second module. Two circumference grooves 104, 106 are formed on the exterior portion of the housing 102 and a primary seal 110 and a secondary seal 120 of dual seals such as O-rings are, respectively, installed in the grooves 104, 106 so that the outer surfaces of the dual seals 110, 120 contact to an inner surface of an end portion of the tool module and the dual seals 110, 120 can seal the inner space of the tool module from an external environmental space with high pressure.

The dual seals 110, 120 are elastic element which may be made of an elastomer. The elastomer may be a chemical compound having at least one of fluoro-elastomer (FKM), tetrafluoro-ethylene-propylene elastomer (FEPM), perfluoro-elastomer (FFKM), hydrogenated nitrile elastomer (HNBR), nitrile elastomer (NBR), copolymer of isobutylene and isoprene (IIR) and ethylene propylene-diene elastomer (EPDM) although other elastomers and materials may also be suitable depending upon the application. The elastomer may be a composite having the foregoing chemical compound as a matrix. For example, the dual seals 110, 120 may includes a ternary fluoroelastomer (FKM) and carbon nanofibers as described in U.S. Patent Application Publication 2011/0156357 and U.S. Pat. No. 7,919,554, which are incorporated herein by reference in their entirety.

Figure 2A:
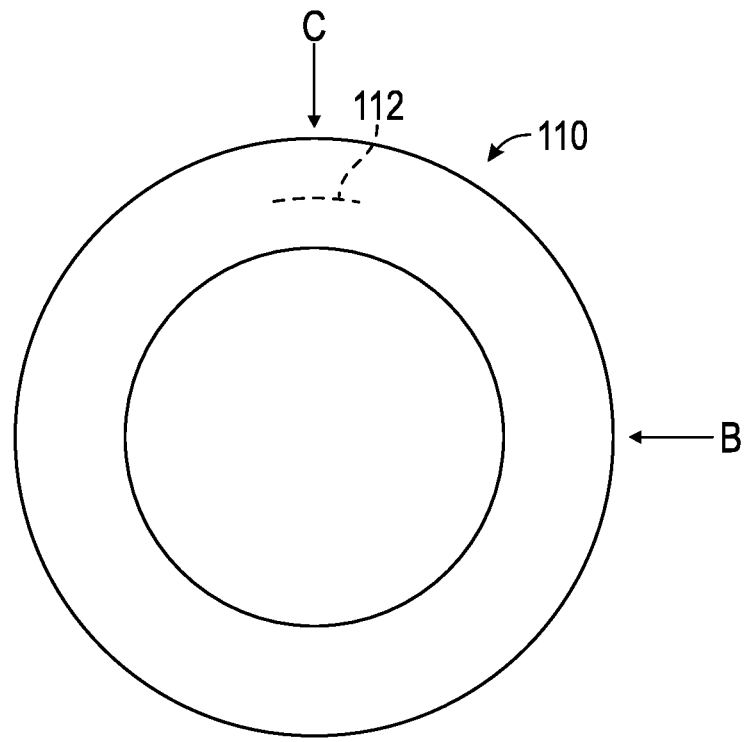
FIG. 2A is a front view of the primary seal of dual seals.
Figure 2B:
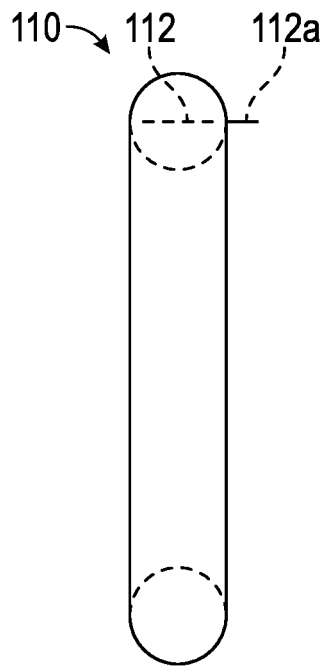
FIGS. 2B and 2C are, respectively, a side view and a top view of the primary seal as viewed from the directions B and C in FIG. 2A.
Figure 2C:
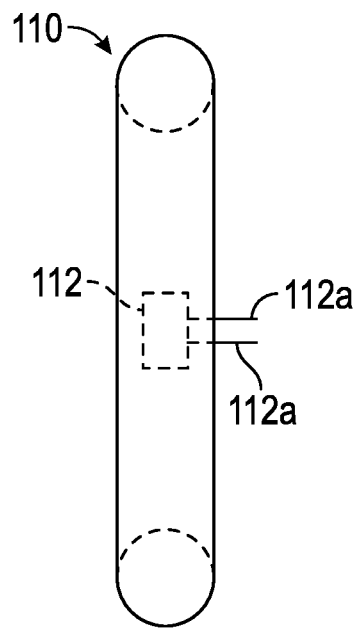
Figure 3:
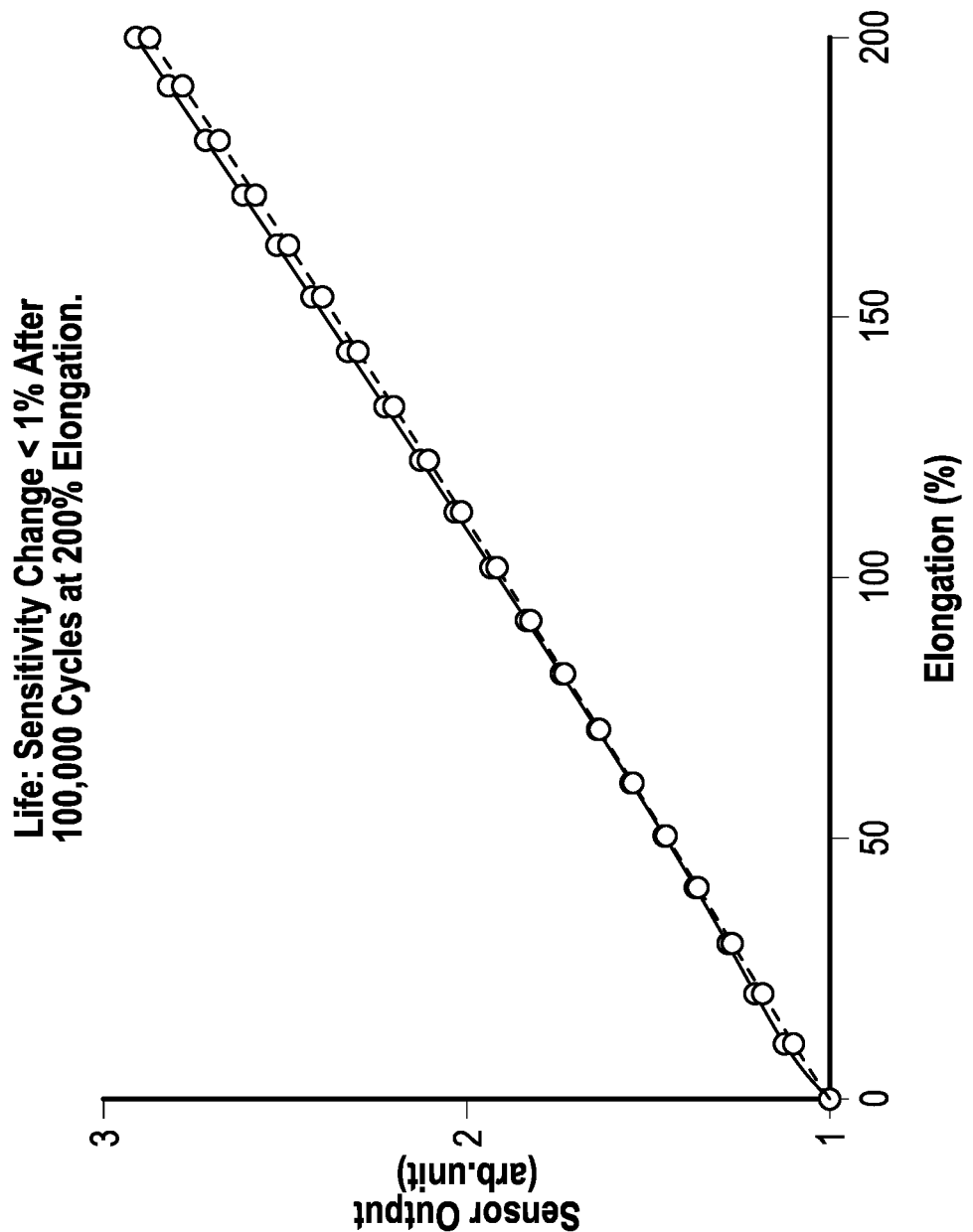
FIG. 3 illustrates one example of a graph showing output characteristics between a sensor output and elongation of the flexible-type sensor according to the disclosure herein.

FIG. 2A is a front view of the primary seal 110 of dual seals according to embodiments of the disclosure, FIG. 2B a side view of the primary seal 110 as viewed from the direction B, and FIG. 2C is a side view of the primary seal 110 as viewed from the directions C in FIG. 2A. The primary seal 110 includes a flexible-type sensor 112 for sensing at least one of strain and stress of the primary seal 110. The sensor 112 may have a shape like a thin film and may be installed in the primary seal 110 by embedding the sensor 112 during a fabrication process of the primary seal 110. The sensor 112 has output terminals 112*a* for outputting an output signal from the sensor 112. The output characteristics of the sensor 112 show an almost linear relation between the output and elongation of the sensor 112 as shown in FIG. 3. The sensor 112 may be a stretchable strain sensor or polymer sheet that can be available from, for example, BANDO CHEMICAL INDUSTRIES, LTD. in Japan. The sensor 112 may be a capacitance-type sensor sheet as described in the U.S. Pat. Application Publication No. 2015/0268106, which is incorporated herein by reference in its entirety. The sensor 112 may also be a fluoropolymers-type sensor released by Nippon Valqua Industries, Ltd. in Japan. It is noted that the flexible-type sensor may be installed in the secondary seal 120.

Figure 4:
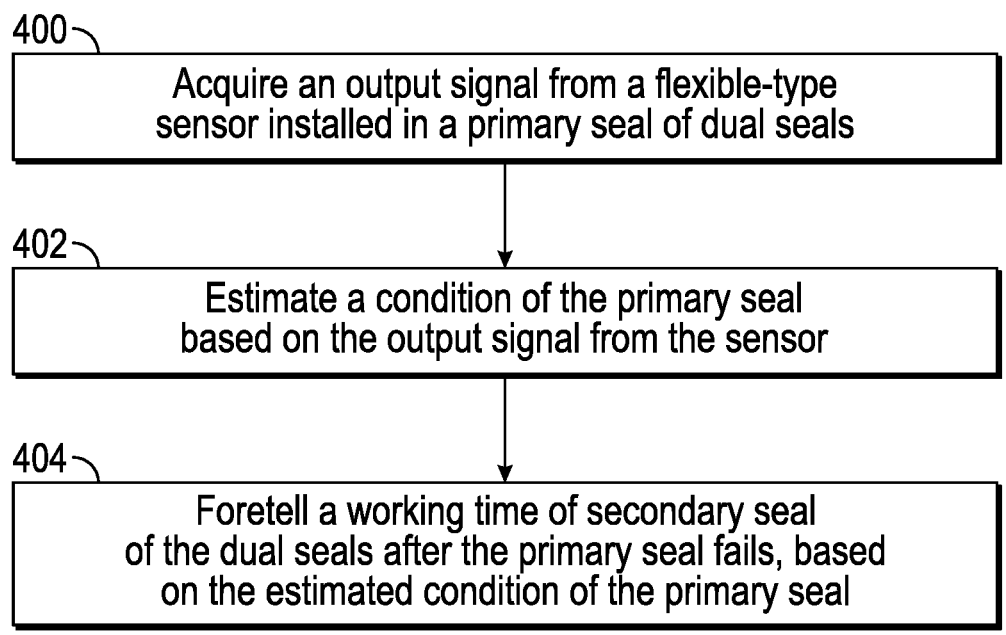
FIG. 4 is a flowchart showing one examples of a method for monitoring a condition of the primary seal 110 according to the disclosure herein.

FIG. 4 is a flowchart showing one examples of a method for monitoring a condition of the primary seal 110 according to the disclosure herein. At step 400 in FIG. 4, an output signal is acquired from the flexible-type sensor 112 installed in the primary seal 110 of dual seals. A condition of the primary seal 110 is estimated based on the output signal from the sensor 112, at step 402. Based on the estimated condition of the primary seal 110, a working time, which means that how many hours can work, of the secondary seal 120 of dual seals after the primary seal 110 fails can be foretold, at step 404 in FIG. 4.

Figure 5A:
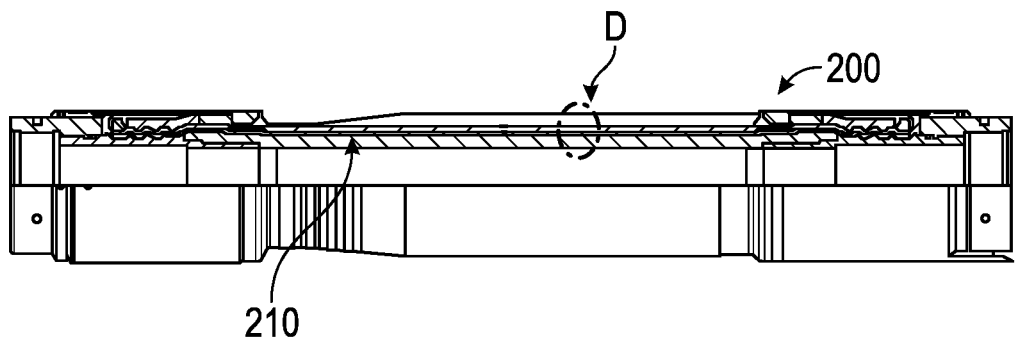
FIGS. 5A and 5B are, respectively, a side view and an enlarged cross-sectional view of one example of an inflatable packer for an MDT in a wireline tool according to embodiments of the disclosure.
Figure 5B:
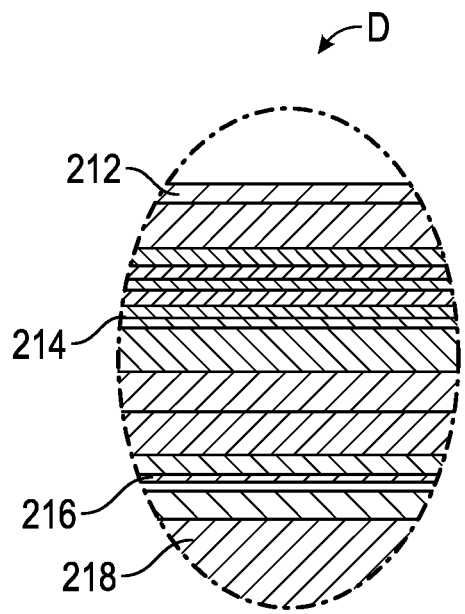

FIG. 5A is a side view of one example of an inflatable packer 210 for an MDT (Modular Formation Dynamics Tester) 200 in a wireline tool, and FIG. 5B is an enlarged cross-sectional view of the area D in FIG. 5A, according to embodiments of the disclosure. The MDT is a wireline tool that can be customized and efficiently assembled on-site to meet exact requirements depending on the needs of a particular well evaluation, by combining a plurality of modules/cartridges/chambers such as a power cartridge, a hydraulic module, a sample chamber, a single-probe module, a dual-probe module and a flow control module. The inflatable packer 210 may be installed, for example, in the single-probe module and the dual-probe module of the MDT. The inflatable packer 210 may use an inflatable bladder to expand a packer element against a casing or wellbore. In preparation for setting the packer, a drop ball or series of tubing movements are generally required, with the hydraulic pressure required to inflate the packer provided by carefully applying surface pump pressure. As shown in FIG. 5B, the inflatable packer 210 may include an outer rubber layer 212 to apply a sealing differential pressure, mechanical layers 214 such as steel cables to hold pressure differential, anti-extrusion layers 216 such as small cables and/or fibers to hold holt rubber, and an inner bladder layer 218 such as an HNBR (Hydrogenated Nitrile Butadiene Rubber) rubber to apply a sealing inflation pressure.

The aforementioned flexible-type sensor for sensing at least one of strain and stress may be installed in at least one of elastic elements such as the outer rubber layer 212 and the inner bladder layer 218 of the packer 210, in order to measure the elongation to optimize the applied internal pressure on the packer 210.

Figure 6:
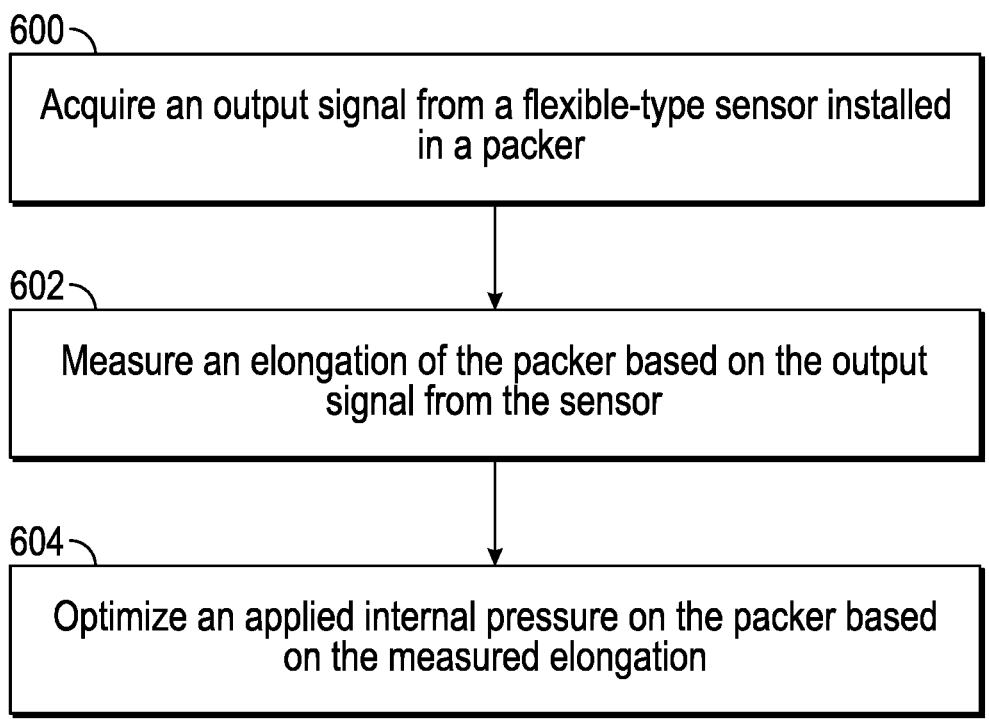
FIG. 6 is a flowchart showing one examples of a method for monitoring a condition of the inflatable according to the disclosure herein.

FIG. 6 is a flowchart showing one examples of a method for monitoring a condition of the packer 210 according to the disclosure herein. At step 600 in FIG. 6, an output signal is acquired from the flexible-type sensor installed in the packer 210. An elongation as a condition of the packer 210 is measured based on the output signal from the sensor, at step 602. Based on the measured elongation (condition) of the packer 210, an applied internal pressure on the packer 210 can be optimized, at step 604 in FIG. 6.

Figure 7:
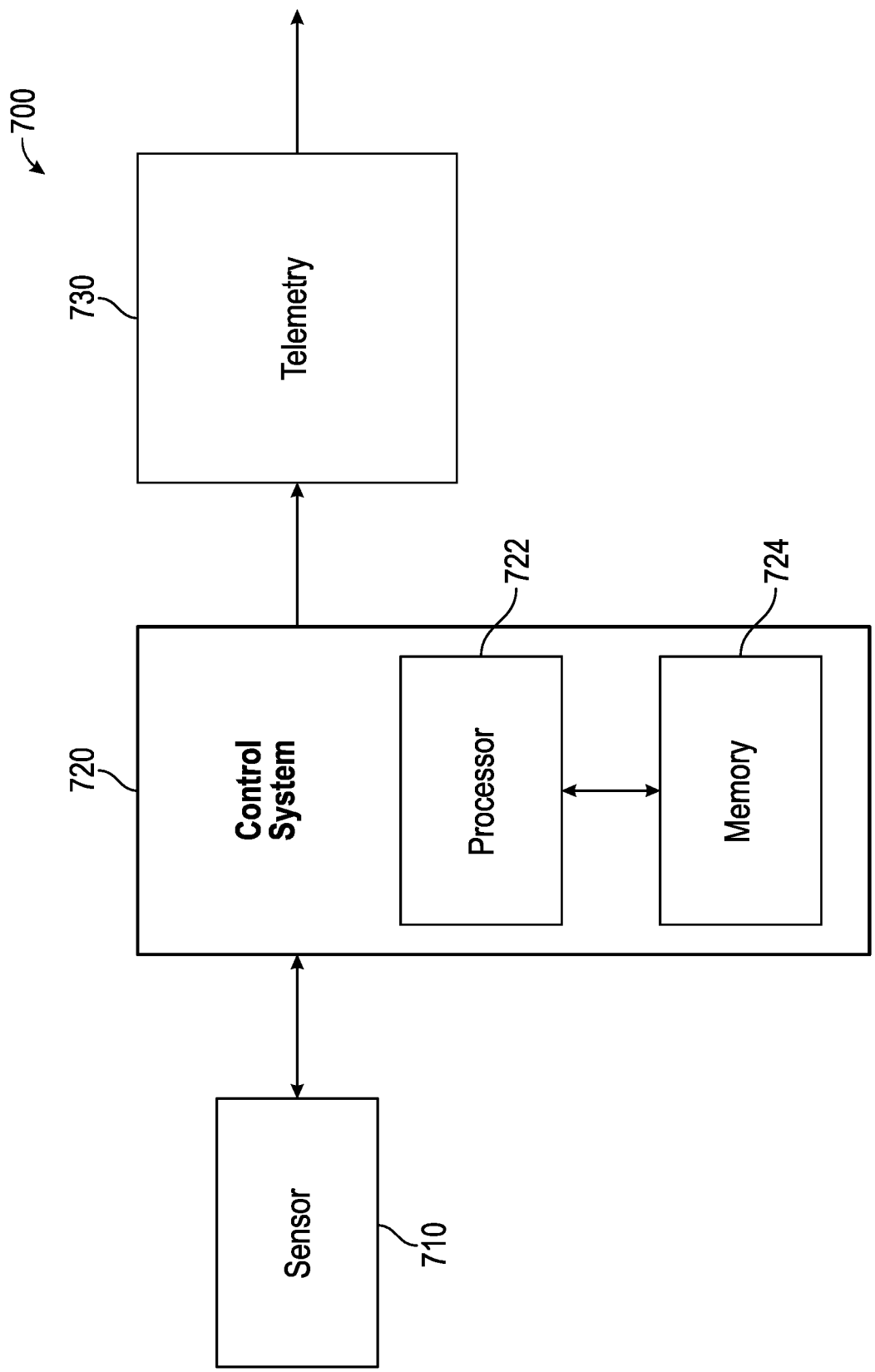
FIG. 7 is a block diagram of an example system 700 for monitoring a condition of an elastic element such as the foregoing seal 110 and packer 210 used in a downhole tool according to the disclosure herein.

FIG. 7 is a block diagram of an example system 700 for monitoring a condition of an elastic element such as the foregoing seal 110 and packer 210 used in a downhole tool, which is used in the methods disclosed herein. The system 700 may comprise the foregoing sensor 710, a control system 720 and a telemetry 730. The sensor 710 may be mounted in the foregoing mounting configuration as described in aforementioned embodiments. The control system 720 may include electronics or circuitry for driving the sensor 710 and/or detecting signals by the sensor 710. The control system 720 may also include a processor 722 and a memory 724. By executing program codes of software and/or firmware, the processor 722 can be used to control and/or drive the sensor 710, receive output signals from the sensor 710 and record the output signals in the memory 724. The processor 722 can be also used to estimate a condition of the primary seal 110 based on the output signal from the sensor 710 and the processor 722 may be used to foretell the working time of the secondary seal 120 of dual seals after the primary seal 110 fails based on the estimated condition of the primary seal 110 as shown in FIG. 4. The processor 722 can be also used to measure an elongation of the packer 210 based on the output signal from the sensor 710 and the processor 722 may be used to optimize the applied internal pressure on the packer 210 based on the measured elongation of the packer 210 as shown in FIG. 6.

The processor 722 may be implemented by one or more circuit(s), programmable processor(s), application specific integrated circuit(s) (ASIC(s)), programmable logic device (s) (PLD(s)) and/or field programmable logic device(s) (FPLD(s)), etc. The data acquired or computed in the processor 722 may be stored in the memory 724 and transmitted to an external apparatus such as a surface apparatus by telemetry 730 via a cable. The processor 722 is in communication with the memory 724 including a volatile memory and a non-volatile memory via a bus. The volatile memory may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory may be implemented by flash memory and/or any other desired type of memory device. The memory 724 may include a USB memory, a memory card, a magnetic tape or disk, an optical disk, etc. The pressure echo signals from the transducers acquired from the transducers 720 are temporarily or permanently stored in the memory 724. Software and/or firmware including instructions for controlling the sensor and processing the data for monitoring the condition of elastic elements such as the foregoing seal 110 and packer 210 used in a downhole tool are also stored in the memory 724.

As an alternative to implementing the methods and/or apparatus described herein in a system such as the processing system of FIG. 7, the methods and/or apparatus described herein may be embedded in a structure such as a processor and/or an ASIC (application specific integrated circuit).

Figure 8:
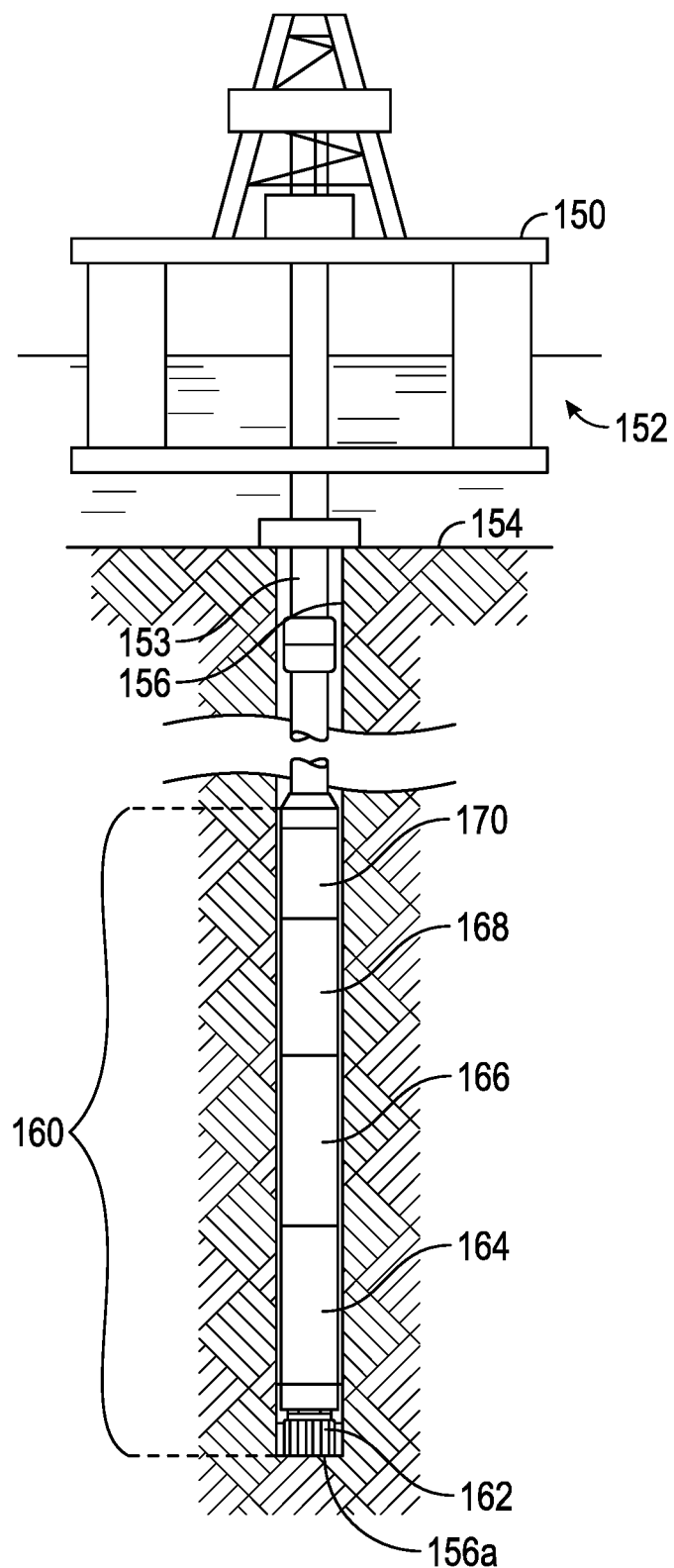
FIG. 8 is a cross-sectional view schematically illustrating a logging tool used for subsea applications according to one embodiment of the disclosures herein.
Figure 9:
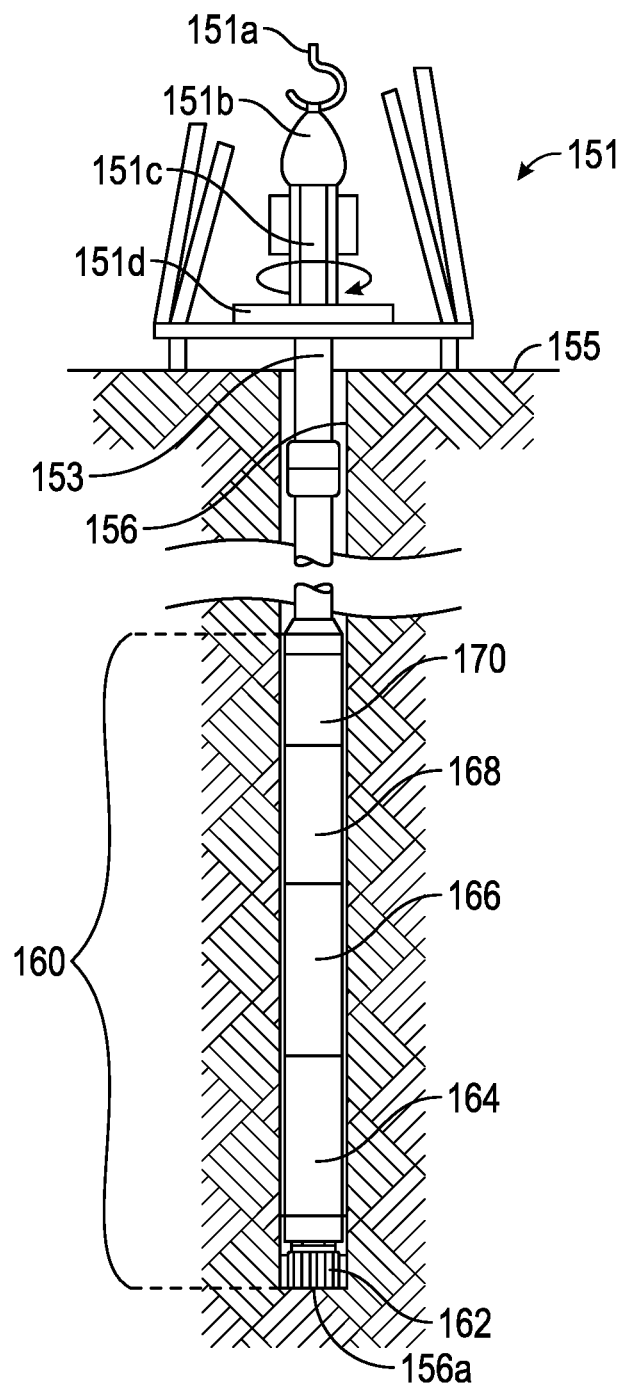
FIG. 9 is a cross-sectional view schematically illustrating a logging tool used for underground applications according to one embodiment of the disclosures herein.

The aforementioned systems and methods according to one embodiment of the disclosures herein that is used for monitoring the condition of elastic elements in the downhole tool is described below with reference to FIGS. 8 and 9. FIG. 8 is a cross-sectional view schematically illustrating a logging tool used for subsea applications according to one embodiment of the disclosures herein. FIG. 9 is a cross-sectional view schematically illustrating a logging tool used for underground applications according to one embodiment of the disclosures herein.

As illustrated in FIG. 8, when probing undersea resources using a measuring instrument provided in a drilling assembly, a bottom hole assembly (BHA) 160 (i.e., logging tool) is caused to advance in a borehole 156 (vertical or horizontal passageway) formed in an ocean floor 154 from a platform 150 on the sea 152, and the underground structure and the like are probed to determine the presence or absence of the target substance (e.g., petroleum), for example. The bottom hole assembly 160 is secured on the end of a long drill string 153 that extends from the platform 150, and includes a plurality of modules. For example, the bottom hole assembly 160 may include a drill bit 162, a rotary steerable system (RSS) 164, a mud motor 166, a measurement-while-drilling module 168, and a logging-while-drilling module 170 that are connected in this order from the end of the bottom hole assembly 160. The drill bit 162 is rotated (drills) at a bottom hole 156a of the borehole 156.

The rotary steerable system 164 includes a deviation mechanism that causes the drill bit 162 to deviate in a given direction in a state in which the drill bit 162 rotates to enable directional drilling. The seal according to one embodiment of the disclosures herein may be applied to the rotary steerable system 164. The rotary steerable system 164 requires the seal that exhibits high pressure resistance up to about 15,000 [psi]-45,000 [psi], or the seal that exhibit high chemical resistance against mud, for example.

The mud motor 166 is also referred to as a downhole motor. The mud motor 166 is a fluid-driven motor that is driven by the flow of mud and rotates the drill bit 162. Examples of the mud motor 166 include a mud motor for deviated wellbore drilling applications. The seal according to one embodiment of the disclosures herein may be applied to the mud motor 166.

The measurement-while-drilling module 168 may include a measurement-while-drilling instrument that is disposed inside a chamber provided on a wall of a pipe (drill collar) that has a thick wall. The measurement-while-drilling instrument includes various sensors. For example, the measurement-while-drilling instrument measures bottom hole data (e.g., orientation, slope, bit direction, load, torque, temperature, and pressure), and transmits the measured data to the ground in real time.

The logging-while-drilling module 170 may include a logging-while-drilling instrument that is disposed inside a chamber provided on a wall of a pipe (drill collar) that has a thick wall. The logging-while-drilling instrument includes various sensors. For example, the logging-while-drilling instrument measures specific resistivity, porosity, acoustic wave velocity, gamma-rays, and the like to obtain physical logging data, and transmits the physical logging data to the ground in real time.

As illustrated in FIG. 9, when probing underground resources from ground 155 using a measuring instrument provided in a drilling assembly, a platform and a derrick assembly 151 that are disposed over a borehole 156, and a bottom hole assembly (BHA) 160 (i.e., logging tool) that is disposed in a borehole 156 (vertical or horizontal passageway) formed under the derrick assembly 151 are used, for example. The derrick assembly 151 includes a hook 151*a*, a rotary swivel 151*b*, a kelly 151*c*, and a rotary table 151*d*. The bottom hole assembly 160 is secured on the end of a long drill string 153 that extends from the derrick assembly 151, for example. Mud is supplied to the drill string 153 from a pump through the rotary swivel 151*b* to drive a fluid-driven motor of the bottom hole assembly 160. The bottom hole assembly 160 is basically the same as that of the logging tool for subsea applications described with reference to FIG. 9. Therefore, description thereof is omitted. The seal according to one embodiment of the disclosures herein may also be employed for the logging tool for underground applications. The above embodiment has been described taking an example in which the bottom hole assembly 160 includes the drill bit 162, the rotary steerable system 164, the mud motor 166, the measurement-while-drilling module 168, and the logging-while-drilling module 170. Note that the elements may be appropriately selected and combined depending on the logging application.

The oilfield or gasfield application is not limited to the logging tool. For example, the seal according to one embodiment of the disclosures herein may be used for a downhole tractor used for wireline log/logging. Examples of the downhole tractor include "MaxTRAC" or "TuffTRAC" (trademark; manufactured by Schlumberger Limited). The downhole tractor requires a reciprocating seal having high abrasion resistance for longer operational life and reliability at about 175 to 200 [° C.]. or less under high pressure environment at about 15,000-45,000 [psi] or less.

The seal and inflatable packer according to one embodiment of the disclosures herein may also be applied to a formation testing and reservoir fluid sampling tool, for example. Examples of the formation testing and reservoir fluid sampling tool include "Modular Formation Dynamics Tester (MDT)" (trademark; manufactured by Schlumberger Limited).

The seal according to one embodiment of the disclosures herein may also be applied to an in-situ fluid sampling bottle and an in-situ fluid analysis and sampling bottle, for example. Such a bottle may be used for a formation testing/reservoir fluid sampling tool or a wireline log/logging tool, for example.

The seal according to one embodiment of the disclosures herein may also be applied to an in-situ fluid analysis tool (IFA), for example.

The seal according to one embodiment of the disclosures herein may also be applied to all tools used for wireline log/logging, logging while drilling, well testing, perforation, and sampling operations, for example.

The seal according to one embodiment of the disclosures herein may also be applied to a side wall coring tool, for example.

The seal according to one embodiment of the disclosures herein may also be applied to a telemetry and power generation tool in drilling applications, for example.

The seal according to one embodiment of the disclosures herein may also be applied to an inflate packer that is used for isolating part of a wellbore for sampling and formation testing, for example.

The seal according to one embodiment of the disclosures herein may also be applied to an apparatus such as a well head which may be disposed over a downhole and used in the platform in FIGS. 8 and 9, for example.

Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

According to one embodiment of this disclosure, the comparatively less expensive materials can be modified to exhibit required properties of strength and corrosion resistance sufficient to either equal or exceed current requirements for service.

The preceding description has been presented only to illustrate and describe certain embodiments. It is not intended to be exhaustive or to limit the disclosures to any precise form disclosed. Many modifications and variations are possible in light of the above teaching.

The embodiments and aspects were chosen and described in order to best explain principles of the disclosures and its practical applications. The preceding description is intended to enable others skilled in the art to best utilize the principles in various embodiments and aspects and with various modifications as are suited to the particular use contemplated. It is intended that the scope of the disclosures be defined by the following claims.

What is claimed is:

1. A method for monitoring a condition of an elastic element used in a downhole tool, the method comprising:
   acquiring an output signal from a flexible-type sensor installed in the elastic element, the sensor sensing at least one of strain and stress of the elastic element;
   estimating a condition of the elastic element based on the output signal from the sensor;
   estimating a condition of a primary seal of dual seals based on the output signal from the sensor; and
   foretelling a working time of a secondary seal of the dual seals after the primary seal fails, based on the estimated condition of the primary seal.

2. The method according to claim 1, wherein the sensor is a flexible polymer sensor.

3. The method according to claim 2, wherein the flexible polymer sensor is a fluoropolymers sensor.

4. The method according to claim 1, wherein the elastic element is a seal in a field joint or bulkhead used in the downhole tool.

5. The method according to claim 1, wherein the downhole tool is a wireline logging tool, a LWD (logging-while-drilling) or MWD (measurements while drilling) tool.

6. A system for monitoring a condition of an elastic element used in a downhole tool, the system comprising:
   a flexible-type sensor installed in the elastic element, the sensor sensing at least one of strain and stress of the elastic element; and
   a processor to acquire an output signal from the sensor and estimate a condition of the elastic element based on the output signal from the sensor;
   wherein the processor is used to estimate a condition of a primary seal of dual seals based on the output signal from the sensor and foretell a working time of a secondary seal of the dual seals after the primary seal fails, based on the estimated condition of the primary seal.

7. The system according to claim 6, wherein the sensor is a flexible polymer sensor.

8. The system according to claim 7, wherein the flexible polymer sensor is a fluoropolymers sensor.

9. The system according to claim 6, wherein the elastic element is a seal in a field joint or bulkhead used in the downhole tool.

10. The system according to claim 6, wherein the downhole tool is a wireline logging tool, a LWD (logging-while-drilling) or MWD (measurements while drilling) tool.

11. A method for monitoring a condition of an elastic element used in a downhole tool, the method comprising:
    acquiring an output signal from a flexible-type sensor installed in the elastic element, the sensor sensing at least one of strain and stress of the elastic element; and
    estimating a condition of the elastic element based on the output signal from the sensor;
    wherein the elastic element is an inflatable packer for an MDT (Modular Formation Dynamics Tester) used in a downhole tool and the elastic element comprises at least one of an outer rubber layer of the packer an an inner bladder layer of the packer;
    wherein the sensor is a flexible polymer sensor.

12. The method according to claim 11, wherein the flexible polymer sensor is a fluoropolymers sensor.

13. The method according to claim 11, further comprising:
    measuring an elongation of the packer based on the output signal; and
    optimizing an applied internal pressure on the packer based on the measured elongation.

14. The method according to claim 11, wherein the downhole tool is a wireline logging tool, a LWD (logging-while-drilling) or MWD (measurements while drilling) tool.

* * * * *